United States Patent
Humphris

(10) Patent No.: US 10,969,404 B2
(45) Date of Patent: Apr. 6, 2021

(54) SCANNING PROBE SYSTEM

(71) Applicant: INFINITESIMA LIMITED, Abingdon (GB)

(72) Inventor: Andrew Humphris, Abingdon (GB)

(73) Assignee: INFINITESIMA LIMITED, Abingdon (GB)

( * ) Notice: Subject to any disclaimer, the term of this patent is extended or adjusted under 35 U.S.C. 154(b) by 0 days.

(21) Appl. No.: 16/603,503

(22) PCT Filed: Apr. 6, 2018

(86) PCT No.: PCT/GB2018/050933
§ 371 (c)(1),
(2) Date: Oct. 7, 2019

(87) PCT Pub. No.: WO2018/185499
PCT Pub. Date: Oct. 11, 2018

(65) Prior Publication Data
US 2020/0041540 A1    Feb. 6, 2020

(30) Foreign Application Priority Data

Apr. 7, 2017 (GB) .................................. 1705613

(51) Int. Cl.
*G01Q 10/06* (2010.01)
(52) U.S. Cl.
CPC .................. *G01Q 10/065* (2013.01)
(58) Field of Classification Search
CPC .................................................. G01Q 10/065
See application file for complete search history.

(56) References Cited

U.S. PATENT DOCUMENTS

2008/0223117 A1   9/2008  Watanabe et al.
2014/0289911 A1   9/2014  Humphris
(Continued)

FOREIGN PATENT DOCUMENTS

WO    WO-2015/197398 A1    12/2015
WO    WO-2016/198606 A1    12/2016

OTHER PUBLICATIONS

International Search Report and Written Opinion issued in PCT Patent Application No. PCT/GB2018/050933 dated Jun. 8, 2018.

*Primary Examiner* — Nicole M Ippolito
*Assistant Examiner* — Hanway Chang
(74) *Attorney, Agent, or Firm* — Marshall, Gerstein & Borun LLP

(57) ABSTRACT

A method of scanning a feature with a probe, the probe comprising a cantilever mount, a cantilever extending from the cantilever mount to a free end, and a probe tip carried by the free end of the cantilever. An orientation of the probe is measured relative to a reference surface to generate a probe orientation measurement. The reference surface defines a reference surface axis which is normal to the reference surface and the probe tip has a reference tilt angle relative to the reference surface axis. A shape of the cantilever is changed in accordance with the probe orientation measurement so that the probe tip moves relative to the cantilever mount and the reference tilt angle decreases from a first reference tilt angle to a second reference tilt angle. A sample surface is scanned with the probe, wherein the sample surface defines a sample surface axis which is normal to the sample surface and the probe tip has a scanning tilt angle relative to the sample surface axis. During the scanning of the sample surface the cantilever mount is moved so that the probe tip is inserted into a feature in the sample surface with the scanning tilt angle below the first reference tilt angle.

20 Claims, 10 Drawing Sheets

(56) References Cited

U.S. PATENT DOCUMENTS

2017/0016932 A1    1/2017   Humphris
2017/0059609 A1    3/2017   Watanabe et al.

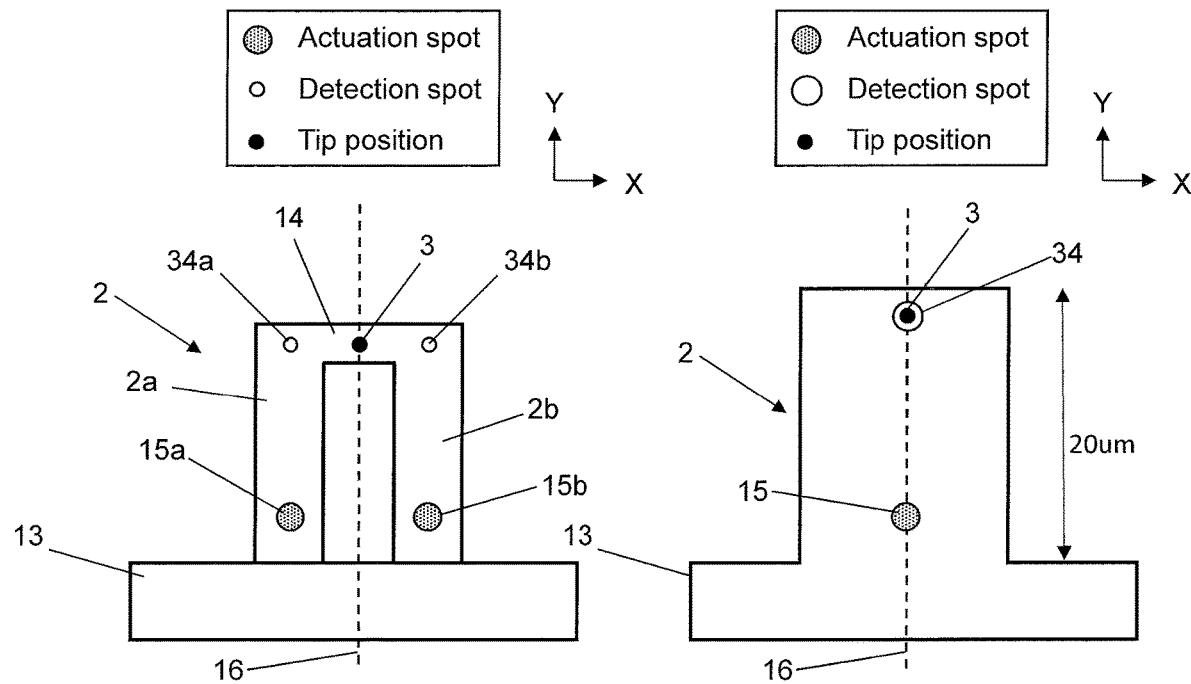
Figure 4  Figure 2
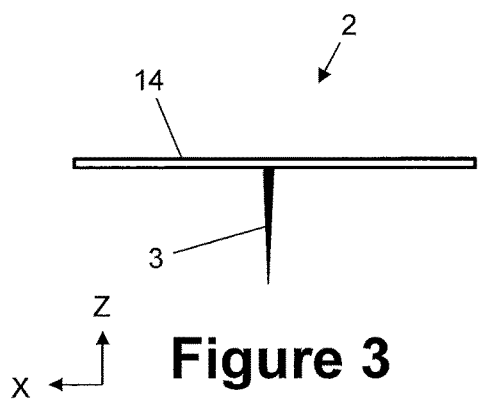
Figure 3
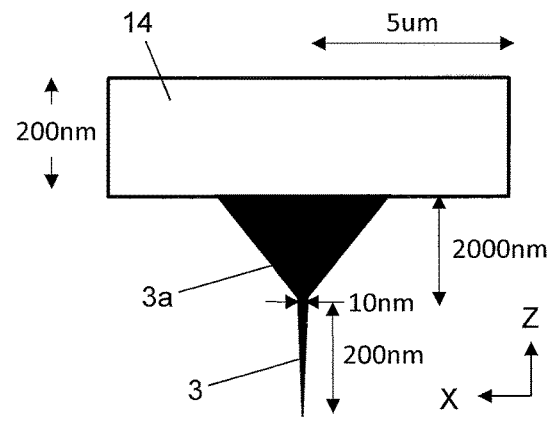
Figure 5

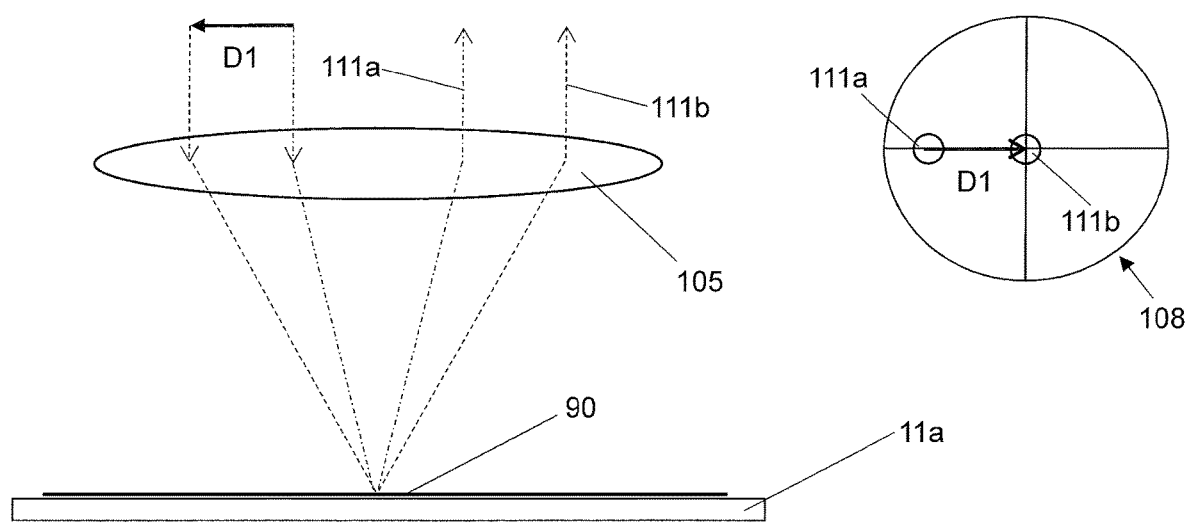
Figure 7a
Figure 7b
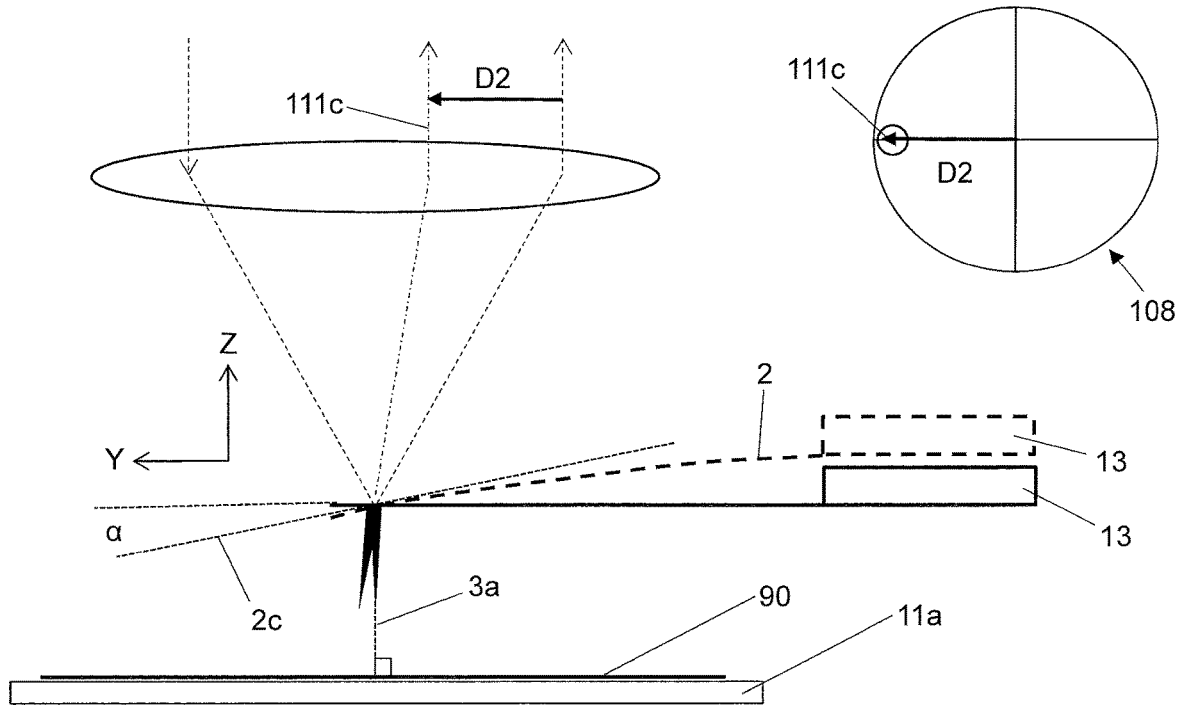
Figure 8a
Figure 8b

Figure 11a
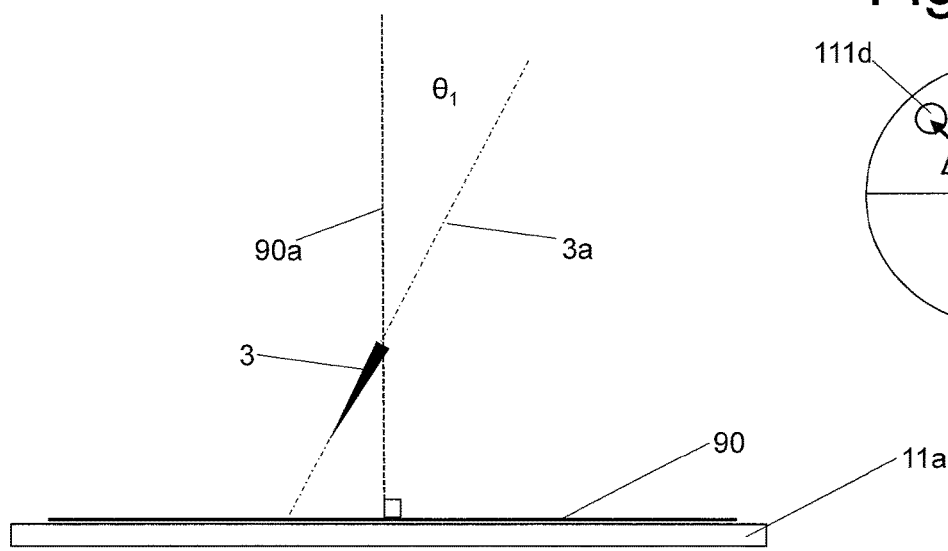
Figure 11b
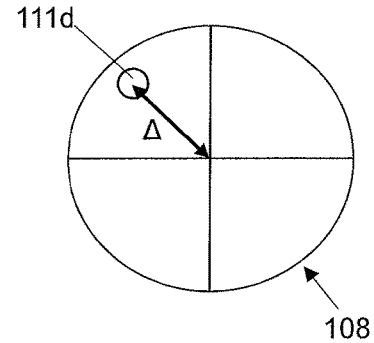
Figure 12b
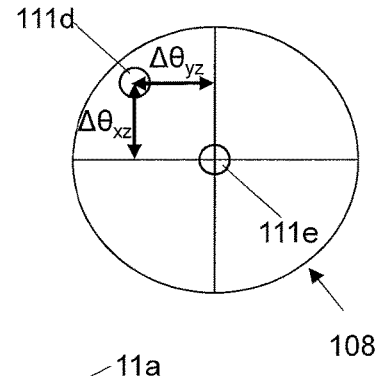
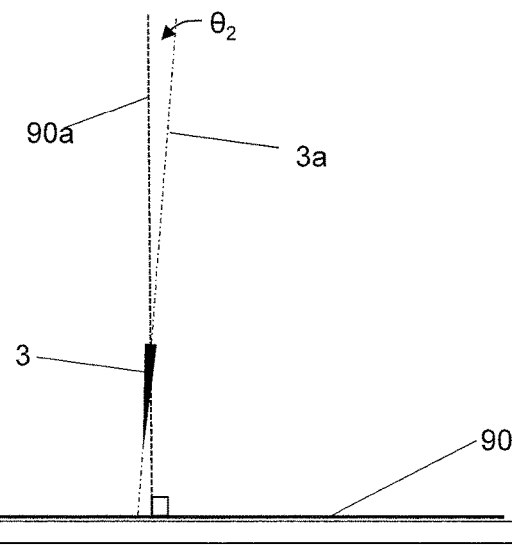
Figure 12a

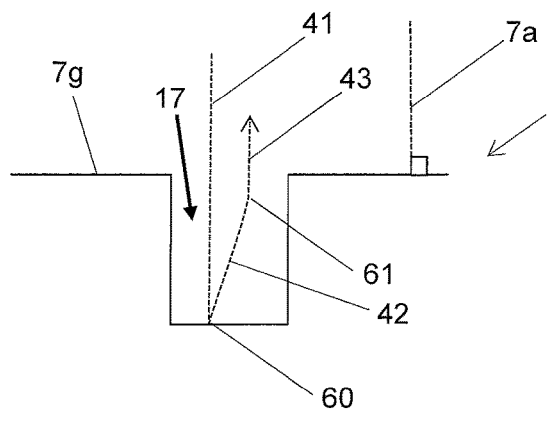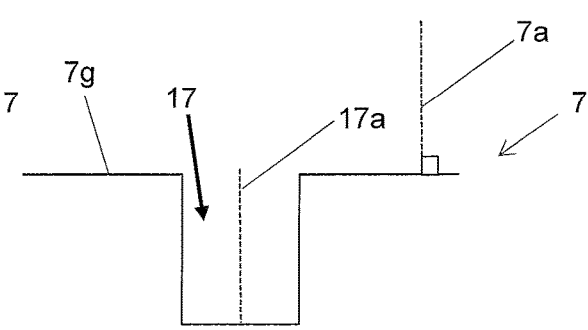
Figure 13a  Figure 13b
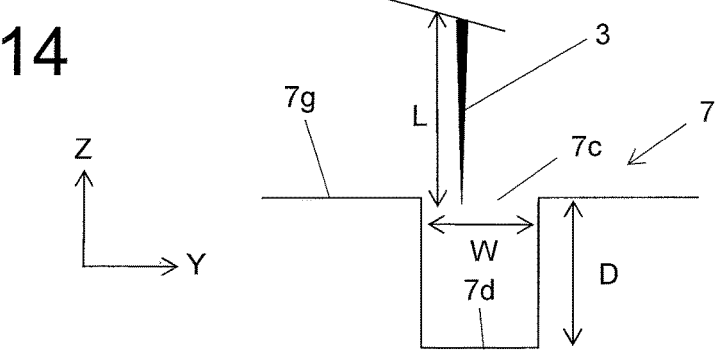
Figure 14
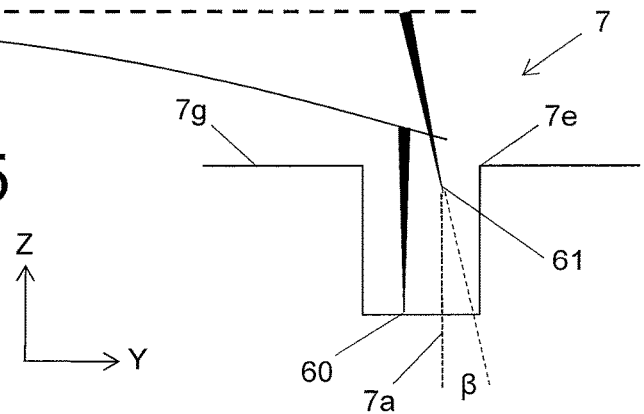
Figure 15

150

SCANNING PROBE SYSTEM

FIELD OF THE INVENTION

The present invention relates to a method and associated apparatus for scanning a feature with a probe, and a method of orienting a cantilever relative to a reference surface.

BACKGROUND OF THE INVENTION

A known scanning probe system is described in WO2016/198606. The system has a probe comprising a cantilever extending from a base to a free end, and a probe tip carried by the free end of the cantilever. A first driver is provided with a first driver input, the first driver arranged to drive the probe in accordance with a first drive signal at the first driver input. A second driver is provided with a second driver input, the second driver arranged to drive the probe in accordance with a second drive signal at the second driver input. A control system is arranged to control the first drive signal so that the first driver drives the base of the cantilever repeatedly towards and away from a surface of a sample in a series of cycles. A surface detector is arranged to generate a surface signal for each cycle when it detects an interaction of the probe tip with the surface of the sample. The control system is also arranged to modify the second drive signal in response to receipt of the surface signal from the surface detector, the modification of the second drive signal causing the second driver to control the probe tip.

A method of investigating a sample surface is disclosed in US2014/0289911. A probe is brought into close proximity with a first sample and scanned across the first sample. A response of the probe to its interaction with the sample is monitored using a detection system and a first data set is collected indicative of said response. The probe and/or sample is tilted through a tilt angle. The probe is scanned across the first sample or across a second sample after the tilting step, and a response of the probe to its interaction with the scanned sample is monitored using a detection system and a second data set is collected indicative of said response. The method includes the additional step of analysing the first data set prior to tilting the probe and/or sample in order to determine the tilt angle.

US2017/0016932 discloses a probe system comprising a probe with first and second arms and a probe tip carried by the first and second arms. An illumination system is arranged to deform the probe by illuminating the first arm at a first actuation location and the second arm at a second actuation location each with a respective illumination power. An actuation controller is arranged to independently control the illumination power at each actuation location in order to control the height and tilt angle of the probe and thus height and lateral position of the tip. The first and second arms are mirror images of each other on opposite sides of a plane of symmetry passing through the probe tip. A detection system is provided which not only measures a height of the probe tip to generate a height signal, but also measures a tilt angle of the probe to generate a tilt signal from which the lateral position of the tip can be determined.

A method of examining a sample surface with a probe tip carried by a cantilever is described in WO2015/197398. If the probe tip is scanning a portion of the sample surface with a high aspect ratio, then the cantilever is twisted so that the probe tip becomes tilted.

Another known scanning probe microscope is described in US2008/0223117.

An optical axis adjustment method for a scanning probe microscope is described in US2017/0059609.

SUMMARY OF THE INVENTION

A first aspect of the invention provides a method according to claim 1, and apparatus according to claim 22. In WO2015/197398, the probe tip angle is increased to scan high aspect ratio features, whereas in the first aspect of the invention the probe tip is inserted into a feature of a sample surface at a reduced scanning tilt angle. The method of WO2015/197398 is suitable for scanning a protruding high aspect ratio feature since the tilted probe tip can approach the protruding feature from the side without clashing with another part of the sample surface. However it has been realised that the method of WO2015/197398 is not suitable for scanning indented features such as trenches, holes, wells or pits, since the tilted probe tip will clash with the lip of the feature as it is inserted. Therefore in the method of the first aspect of the invention the tilt angle of the probe tip is decreased for insertion into a feature in the sample surface, to avoid such a clash.

Before the probe tip is inserted, an orientation of the probe is measured relative to a reference surface to generate a probe orientation measurement. This reference surface may be part of the sample surface, or a surface of a reference specimen. The shape of the cantilever is changed in accordance with the probe orientation measurement so that the probe tip moves relative to the cantilever mount and a reference tilt angle of the probe tip decreases from a first tilt angle to a second tilt angle relative to the reference surface. At its most basic, the probe orientation measurement may only be used to determine a direction of pivoting of the probe tip required to reduce the reference tilt angle. For example the probe orientation measurement may be used to determine whether to twist the cantilever clockwise or anticlockwise in order to reduce the reference tilt angle. Alternatively the probe orientation measurement may be used to determine a magnitude of pivoting of the probe tip which is required to minimise the reference tilt angle—ideally reducing it to zero so the probe tip is un-tilted as it is inserted into the feature.

The sample surface defines a sample surface axis which is normal to the sample surface and the probe tip has a scanning tilt angle relative to the sample surface axis. Typically the sample surface axis is substantially parallel with the reference surface axis. During the scanning of the sample surface, the cantilever mount is moved so that the probe tip is inserted into the feature in the sample surface with the scanning tilt angle at least below the first reference tilt angle, and preferably much lower. As the probe tip is inserted into the feature, the probe tip is typically substantially fixed at the second reference tilt angle relative to the sample surface axis, optionally with a small dither oscillation either side of the second reference tilt angle.

The scanning tilt angle may remain fixed throughout the scan or it may vary, for instance to rapidly retract the probe tip after it has been inserted into the feature.

Typically measuring the orientation of the probe relative to the reference surface to generate the probe orientation measurement includes interacting with the reference surface—for example by optically measuring an orientation of the reference surface (for instance by reflecting a sensing beam off the reference surface) or by scanning the reference surface with the probe.

The probe orientation measurement may directly measure an orientation of the probe tip, or it may measure an orientation of the cantilever from which the orientation of the probe tip can be deduced.

Changing the shape of the cantilever may comprise flexing the cantilever; twisting the cantilever; or flexing and twisting the cantilever either at the same time or sequentially. Flexing and twisting the cantilever is preferred, since it enables the tilt angle to be controlled and minimised in both axes. Flexing and twisting of the cantilever can optionally be controlled separately and independently.

Other preferred features of the first aspect of the invention are set out in the dependent claims.

A second aspect of the invention provides a method of orienting a cantilever according to claim 19. The second aspect provides an optical method of orienting a cantilever before the probe tip is used to scan indented features such as trenches, holes, wells or pits as in the first aspect of the invention.

Preferred features of the second aspect of the invention are set out in the dependent claims.

A further aspect of the invention provides a method of scanning a feature with a probe, the probe comprising a cantilever mount, a cantilever extending from the cantilever mount to a free end, and a probe tip carried by the free end of the cantilever, the method comprising: measuring an orientation of the probe relative to a reference surface to generate a probe orientation measurement, wherein the reference surface defines a reference surface axis which is normal to the reference surface and the probe tip has a reference tilt angle relative to the reference surface axis; changing a shape of the cantilever in accordance with the probe orientation measurement so that the probe tip moves relative to the cantilever mount and the reference tilt angle decreases from a first reference tilt angle to a second reference tilt angle; and scanning a feature with the probe, wherein the feature defines a feature axis and the probe tip has a scanning tilt angle relative to the feature axis, and during the scanning of the sample surface the cantilever mount is moved so that the probe tip is inserted into the feature with the scanning tilt angle below the first reference tilt angle.

The feature axis is typically normal to the sample surface, although optionally the feature axis may be inclined at an oblique angle to the sample surface.

A further aspect of the invention provides a method of scanning a feature with a probe, the probe comprising a cantilever mount, a cantilever extending from the cantilever mount to a free end, and a probe tip carried by the free end of the cantilever, the method comprising: measuring an orientation of the probe relative to a reference surface to generate a probe orientation measurement, wherein the reference surface defines a reference surface axis which is normal to the reference surface and the probe tip has a tilt angle relative to the reference surface axis; changing a shape of the cantilever in accordance with the probe orientation measurement so that the probe tip moves relative to the cantilever mount and the tilt angle decreases from a first tilt angle to a second tilt angle; and scanning a sample surface with the probe, wherein during the scanning of the sample surface the cantilever mount is moved so that the probe tip is inserted into a feature in the sample surface with the probe tip substantially fixed at the second tilt angle. The tilt angle is typically fixed within a range of +/−0.1 degrees—in other words the tilt angle may vary slightly due to a dither oscillation with an amplitude no greater than 0.1 degrees.

A further aspect of the invention provides a method of scanning a feature with a probe, the probe comprising a cantilever mount, a cantilever extending from the cantilever mount to a free end, and a probe tip carried by the free end of the cantilever, the method comprising: measuring an orientation of the probe relative to a reference surface to generate a probe orientation measurement, wherein the reference surface defines a reference surface axis which is normal to the reference surface and the probe tip has a reference tilt angle relative to the reference surface axis; changing a shape of the cantilever in accordance with the probe orientation measurement so that the probe tip moves relative to the cantilever mount, the reference tilt angle decreases from a first reference tilt angle to a second reference tilt angle, and the shape of the cantilever changes to a scanning shape; and scanning a feature with the probe, wherein during the scanning of the sample surface the cantilever mount is moved so that the probe tip is inserted into the feature with the shape of the cantilever substantially fixed in the scanning shape. The shape is typically fixed within a range of +/−0.1 degrees—in other words the shape may change so that tilt angle of the probe tip varies slightly due to a dither oscillation with an amplitude no greater than 0.1 degrees.

BRIEF DESCRIPTION OF THE DRAWINGS

Embodiments of the invention will now be described with reference to the accompanying drawings, in which:

FIG. 2 is a plan view of a probe with a rectangular cantilever;

FIG. 3 shows the probe of FIG. 2 viewed end-on;

FIG. 4 is a plan view of a probe with a two-arm cantilever;

FIG. 5 shows a probe tip with an alternative structure;

FIG. 7a shows an optical measurement of a reference surface;

FIG. 7b shows two positions of the beam reflected from the reference surface on the segmented photodiode;

FIG. 8a shows an optical measurement of the cantilever;

FIG. 8b shows a position of the beam reflected from the cantilever on the segmented photodiode after it has been bent down by a desired cantilever angle;

FIG. 11a shows the probe tip inclined at a first reference tilt angle relative to the reference surface;

FIG. 11b shows the position of the beam reflected from the cantilever on the segmented photodiode with the probe tip inclined at the first reference tilt angle;

FIG. 12a shows the probe tip inclined at a second reference tilt angle relative to the reference surface;

FIG. 12b shows the position of the beam reflected from the cantilever on the segmented photodiode with the probe tip inclined at the second reference tilt angle;

FIG. 13a shows a trajectory of the probe tip scanning a trench in a sample surface;

FIG. 13b shows the trench axis;

FIG. 14 is a side view of the cantilever being inserted into the trench with its probe tip inclined at a low, or zero, scanning tilt angle relative to the sample surface axis and the trench axis;

FIG. 15 shows the probe tip interacting with the base of the trench and then being rapidly retracted by unbending of the cantilever;

DETAILED DESCRIPTION OF EMBODIMENT(S)

Figure 1:
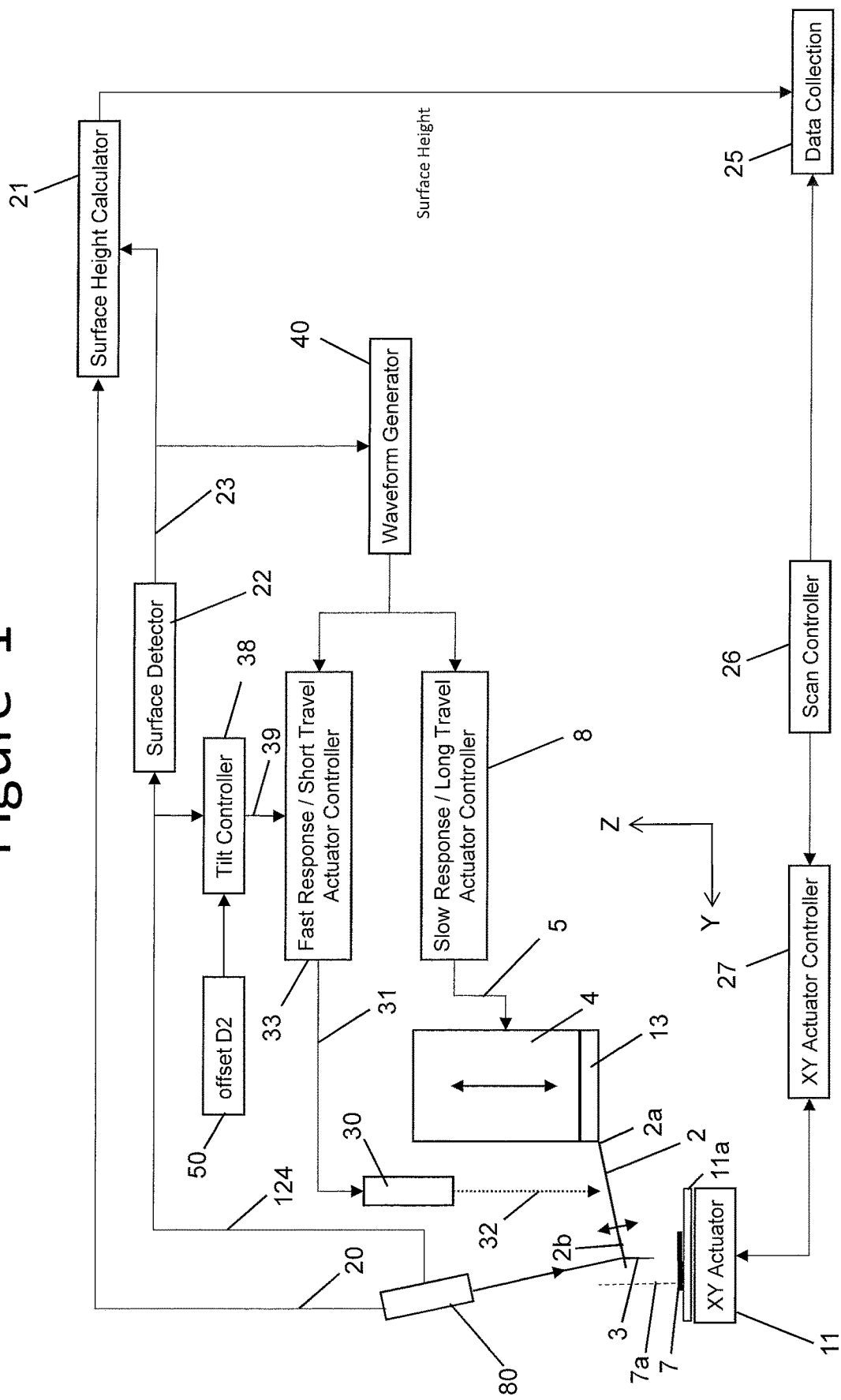
FIG. 1 shows a scanning probe microscopy system.

A scanning probe microscopy system according to an embodiment of the invention is shown in FIG. 1. The system comprises a first driver 4 and a probe comprising a cantilever 2 and a probe tip 3. The bottom of the first driver 4 carries a cantilever mount 13, with the cantilever 2 extending from the cantilever mount 13 from a proximal end or base 2a to a distal free end 2b. The probe tip 3 is carried by the free end 2b of the cantilever 2.

The probe tip 3 comprises a conical or pyramidal structure that tapers from its base to a point at its distal end that is its closest point of interaction with a sample 7 on a sample stage 11a. The probe tip 3 is shown with its axis extending vertically (that is, in the −Z direction based on the frame of reference shown in FIG. 1). The sample comprises a sample surface which defines a sample surface axis 7a which is normal to the sample surface and in FIG. 1 also extends vertically. The cantilever 2, shown in plan in FIG. 2, comprises a single beam with a rectangular profile extending from the cantilever mount 13. The cantilever 2 has a length of about 20 micron, a width of about 10 micron, and a thickness of about 200 nm.

The cantilever 2 is a thermal bimorph structure composed of two (or more) materials, with differing thermal expansions—typically a silicon or silicon nitride base with a gold or aluminium coating. The coating extends the length of the cantilever and covers the reverse side from the tip 3. An illumination system (in the form of a laser 30) under the control of an actuation controller 33 is arranged to illuminate the cantilever on its upper coated side with an intensity-modulated radiation spot 15.

The cantilever 2 is formed from a monolithic structure with uniform thickness. For example the monolithic structure may be formed by selectively etching a thin film of $SiO_2$ or $SiN_4$ as described in Albrecht T., Akamine, S., Carver, T. E., Quate, C. F. J., Microfabrication of cantilever styli for the atomic force microscope, Vac. Sci. Technol. A 1990, 8, 3386 (hereinafter referred to as "Albrecht et al."). The tip 3 may be formed integrally with the cantilever, as described in Albrecht et al., it may be formed by an additive process such as electron beam deposition, or it may be formed separately and attached by adhesive or some other attachment method.

The wavelength of the actuation beam 32 is selected for good absorption by the coating, so that the cantilever 2 bends along its length and moves the probe tip 3. In this example the coating is on the reverse side from the sample so the cantilever 2 bends down towards the sample when heated, but alternatively the coating may be on the same side as the sample so the cantilever 2 bends away from the sample when heated.

In an alternative embodiment, shown in plan in FIG. 4, the cantilever 2 comprises first and second cantilever arms 2a,b. Each cantilever arm extends from the cantilever mount 13 with a proximal end carried by the mount and a free distal end remote from the mount. The distal ends of the arms 2a,b are joined by a bridge 14 which carries the probe tip 3 on its underside. First and second lasers under the control of the actuation controller 33 are arranged to illuminate the arms 2a,b on their coated side with respective intensity-modulated first and second radiation spots 15a,b at respective first and second actuation locations. The tip support structure has a plane of symmetry 16 passing through the probe tip 10, and the spots 15a,b at the first and second actuation locations are symmetrically positioned on opposite sides of the plane of symmetry 16.

The actuation controller 33 outputs a first control signal A1 to the first laser which controls the illumination power of the first radiation spot 15a accordingly, and similarly the actuation controller 33 outputs a second control signal A2 to the second laser which controls the illumination power of the second radiation spot 15b accordingly. The two different control signals A1 and A2 independently control the illumination powers of the two radiation spots 15a,b in order to adjust the tilt angle of the probe tip 3 independently in two orthogonal axes ($\theta_{YZ}$ and $\theta_{XZ}$) as described in further detail in US2017/0016932, the contents of which are incorporated herein by reference.

Optionally the coatings for the two arms may be on opposite sides: that is, the coating on arm 2a may be on its upper side (the reverse side from the sample) so the arm 2a bends towards the sample when heated, and the coating on arm 2b is on its lower side (the same side as the sample) so the arm 2b bends in an opposite direction away from the sample when heated.

Returning to FIG. 1—the first driver 4 is a piezoelectric actuator which expands and contracts up and down in the Z-direction in accordance with a first drive signal at a first driver input 5. As described further below, the first drive signal causes the first driver 4 to move the probe repeatedly towards and away from the sample 7 in a series of cycles. The first drive signal is generated by a first controller 8. Typically the first driver 4 is mechanically guided by flexures (not shown).

Figure 6:
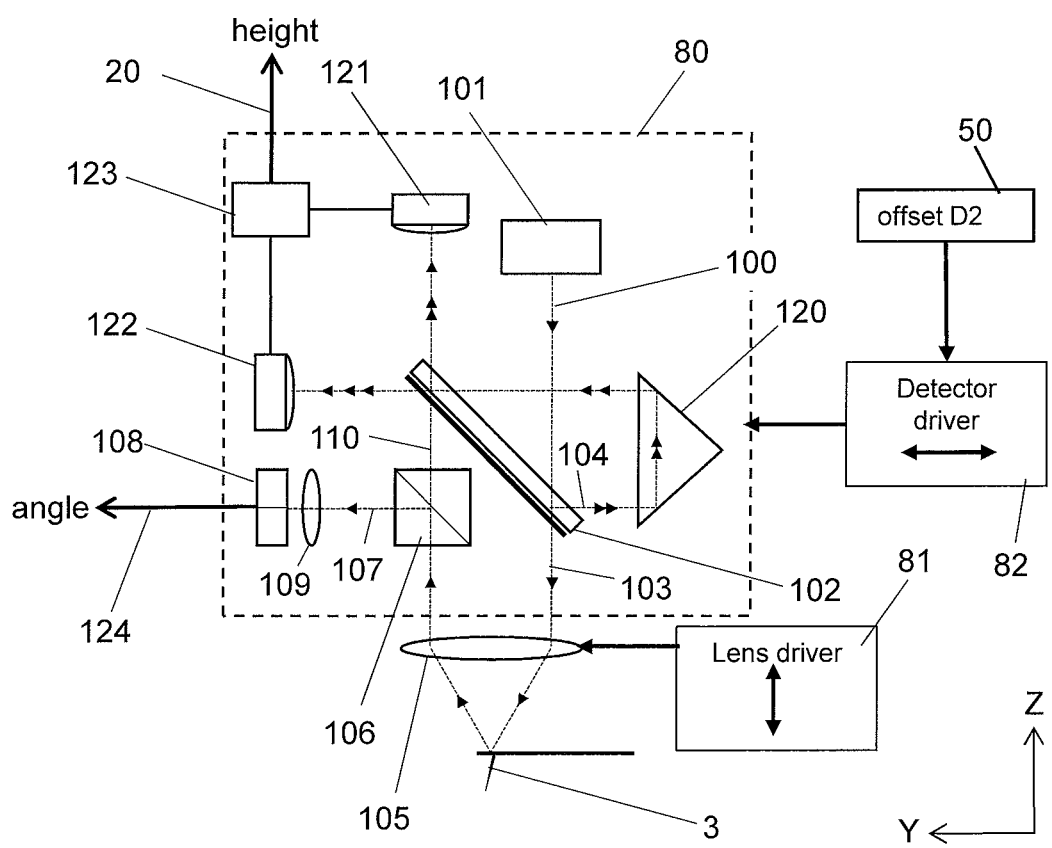
FIG. 6 shows the detector in detail.

An interferometer detector 80 is arranged to detect a height of the free end 2b of the cantilever 2 directly opposite to the probe tip 3. FIG. 1 only shows the detector 80 schematically and FIG. 6 gives a more detailed view. Light 100 from a laser 101 is split by a beam splitter 102 into a sensing beam 103 and a reference beam 104. The reference beam 104 is directed onto a suitably positioned retro-reflector 120 and thereafter back to the beam splitter 102. The retro-reflector 120 is aligned such that it provides a fixed optical path length relative to the vertical (Z) position of the sample 7. The beam splitter 102 has an energy absorbing coating and splits both the incident 103 and reference 104 beams to produce first and second interferograms with a relative phase shift of 90 degrees. The two interferograms are detected respectively at first 121 and second 122 photodetectors.

Ideally, the outputs from the photodetectors 121, 122 are complementary sine and cosine signals with a phase difference of 90 degrees. Further, they should have no dc offset, have equal amplitudes and only depend on the position of the cantilever and wavelength of the laser 101. Known methods are used to monitor the outputs of the photodetectors 121, 122 while changing the optical path difference in order to determine and to apply corrections for errors arising as a result of the two photodetector outputs not being perfectly harmonic, with equal amplitude and in phase quadrature. Similarly, dc offset levels are also corrected in accordance with methods known in the art.

These photodetector outputs are suitable for use with a conventional interferometer reversible fringe counting apparatus and fringe subdividing apparatus 123, which may be provided as dedicated hardware, FPGA, DSP or as a programmed computer. Phase quadrature fringe counting apparatus is capable of measuring displacements in the position of the cantilever to an accuracy of $\lambda/8$. That is, to 66 nm for 532 nm light. Known fringe subdividing techniques, based on the arc tangent of the signals, permit an improvement in accuracy to the nanometre scale or less. In the embodiment described above, the reference beam 104 is arranged to have a fixed optical path length relative to the Z position of the sample 7. It could accordingly be reflected from the surface of the stage 11a on which the sample 7 is mounted or from a retro-reflector whose position is linked to that of the stage. The reference path length may be greater than or smaller than the length of the path followed by the beam 103 reflected from the probe. Alternatively, the relationship between reflector and sample Z position does not have to be fixed. In such an embodiment the reference beam may be reflected from a fixed point, the fixed point having a known (but varying) relationship with the Z position of the sample. The height of the tip is therefore deduced from the interferometically measured path difference and the Z position of the sample with respect to the fixed point.

The interferometer detector 80 is one example of a homodyne system. The particular system described offers a number of advantages to this application. The use of two phase quadrature interferograms enables the measurement of cantilever displacement over multiple fringes, and hence over a large displacement range. Examples of an interferometer based on these principles are described in U.S. Pat. No. 6,678,056 and WO2010/067129. Alternative interferometer systems capable of measuring a change in optical path length may also be employed. A suitable homodyne polarisation interferometer is described in EP 1 892 727 and a suitable heterodyne interferometer is described in U.S. Pat. No. 5,144,150.

Returning to FIG. 1, the output of the detector 80 is a height signal on a height detection line 20 which is input to a surface height calculator 21 and a surface detection unit 22. The surface detection unit 22 is arranged to generate a surface signal on a surface detector output line 23 for each cycle when it detects an interaction of the probe tip 3 with the sample 7.

The reflected beam is also split by a beam splitter 106 into first and second components 107, 110. The first component 107 is directed to a segmented quadrant photodiode 108 via a lens 109, and the second component 110 is split by the beam splitter 102 and directed to the photodiodes 121, 122 for generation of the height signal on the output line 20. The photodiode 108 generates an angle signal 124 which is indicative of the position of the first component 107 of the reflected beam on the photodiode 108, and varies in accordance with the angle of inclination of the cantilever relative to the sensing beam 103.

Figure 9:
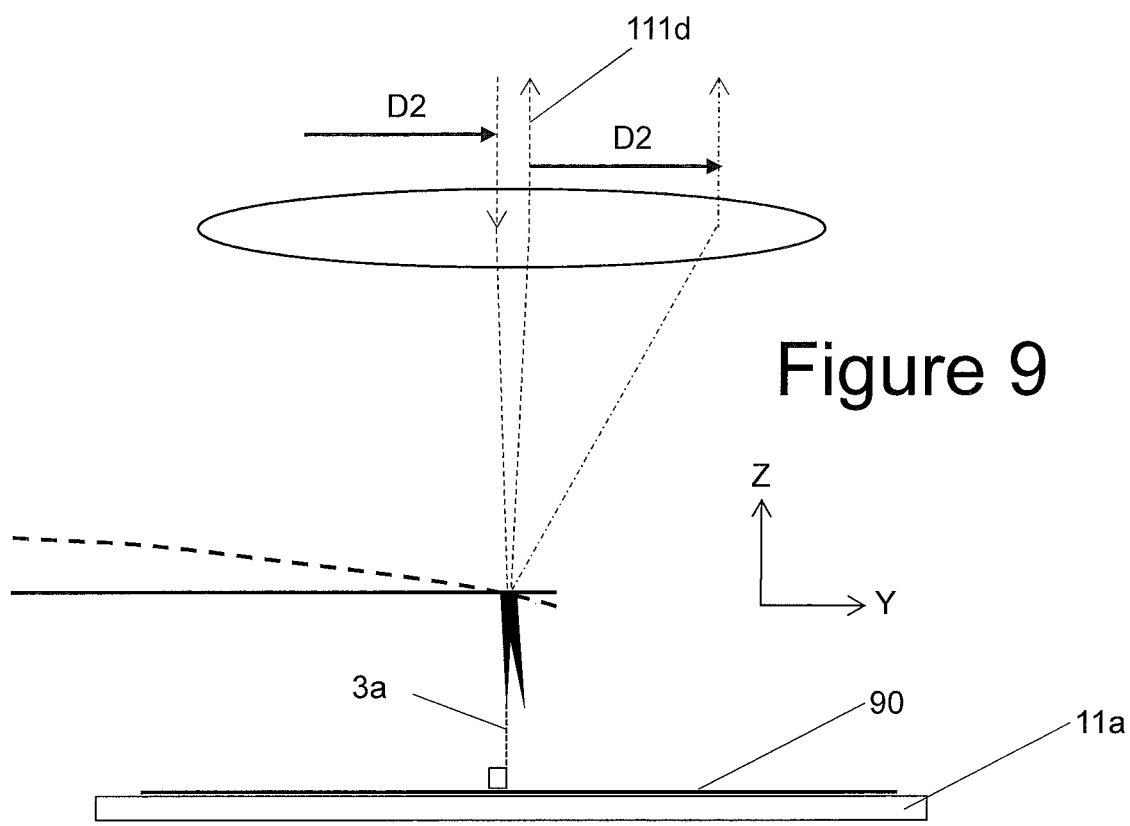
FIG. 9 shows an alternative optical measurement of the cantilever.

FIGS. 7-9 illustrate a method of measuring and orienting the reflective upper surface of the cantilever 2 with respect a reference surface 90 on the sample stage 11a. The reference surface 90 may be part of the sample 7 on the sample stage 11a, or it may be a surface of a separate reference specimen on the sample stage 11a. If a separate reference specimen is used, then it may be located on one side of the sample stage 11a so that both the sample 7 and the reference specimen are located on the sample stage 11a at the same time. Alternatively the reference specimen may be removed after the cantilever 2 has been oriented as described below, then replaced on the sample stage 11a by the sample 7 for scanning.

The lens 105 is first moved in the Z-direction by a lens driver 81 shown in FIG. 6 until the reference surface 90 lies in the front focal plane of the lens as shown in FIG. 7a. This focusing step is achieved by measuring the contrast of the interferometer output 20 and adjusting the Z-position of the lens 105 until the contrast is a maximum. In other words as the lens 105 is moved, the photodetectors 121, 122 will generate signals which increase and decrease as the interferograms go through positions of minimum and maximum interference. The difference in intensity between the maxima and minima is the interferometer contrast, and it reaches a maximum when the sample 7 lies in the front focal plane of the lens. Other methods of placing the surface of the sample 7 in the front focal plane of the lens may be employed, for instance intensity measurements.

The sensing beam 103 passes through the lens 105, and is reflected from the reference surface 90 to form a reflected beam labelled 111a in FIG. 7a. This beam 111a reflected from the reference surface 90 is directed onto the quadrant photodiode 108. The reflected beam 111a falls off-centre on the quadrant photodiode 108 by a distance D1 as shown in FIG. 7b. The detector 80 is then moved laterally relative to the lens 105 by a detector driver 82 by this distance D1 so that the sensing beam 103 shifts by distance D1 as shown in FIG. 7a and the reflected beam shifts to the position 111b so that it falls at the centre of the quadrant photodiode 108 as shown in FIG. 7b.

Next the probe is introduced as shown in FIG. 8a, and the lens 105 is moved up so the reflective upper face of the cantilever 2 is now in the focal plane of the lens 105 instead of the reference surface 90. Again, focusing is achieved by monitoring the contrast measured by the interferometer.

The position of the beam reflected from the cantilever on the photodiode 108, as indicated by the angle signal 124, provides a probe orientation measurement. That is, the angle signal 124 provides an indication of the orientation of a plane 2c tangent to the reflective upper face of the cantilever 2 relative to the reference surface 90. So if the plane 2c is parallel with the reference surface 90, then the beam reflected from the cantilever will fall at the centre of the photodiode 108. More typically the plane 2c is not precisely parallel with the reference surface 90 so the beam will be offset from the centre of the photodiode 108. The direction and magnitude of this offset provides an indication of the direction and magnitude of the tilt between the plane 2c and the plane of the reference surface 90. Finally, the shape of the cantilever 2 is adjusted, based on the angle signal 124, so that the reflected beam falls on the quadrant photodiode 108 at a desired location—the desired location on the photodiode 108 depending on the desired angle of the probe relative to the reference surface 90. So if it is desired that the plane 2c tangent to the reflective upper face of the cantilever 2, at the point directly above the probe tip 3, is parallel with the plane of the reference surface 90, then the shape of the cantilever 2 is adjusted so that the reflected beam falls on the centre of the quadrant photodiode 108. Alternatively, if it is desired that the plane 2c is inclined at a cantilever angle $\alpha$ as shown in FIG. 8a then the cantilever 2 is bent down until the reflected beam has shifted by an offset distance D2 on the photodiode 108 to a position 111c shown in FIG. 8b. Note that in FIG. 8a the cantilever mount 13 has moved up to keep the reflection point in the focal plane of the lens, but equivalently the lens 105 could be moved down to keep the reflection point in the focal plane. Also, if the vertical displacement caused by the bending of the cantilever is less than 1 micron, then the reflection point will remain within the depth of field of the lens 105 so there will be no need to move the cantilever mount 13 or the lens 105 to keep the cantilever in the focal plane.

The orientation process described above is controlled by a tilt controller 38 shown in FIG. 1 which is configured to generate a tilt control signal 39 based on the angle signal 124 and the offset distance D2 which is stored in a memory 50 and associated with a particular probe or set of probes. The laser 30 (or lasers) is arranged to move the cantilever 2 in accordance with a second drive signal at a second driver input 31, and this second drive signal is generated by a second controller 33. The tilt control signal 39 is input to the second controller 33 so that the laser(s) 30 change the shape of the cantilever in accordance with the tilt control signal 39. The tilt controller 38 is configured to receive the probe orientation measurement from the detector 80 via the angle signal 124, and to control the tilt control signal 39 so that the laser(s) 30 changes the shape of the cantilever as required. During the orientation process described above, the shape of the cantilever changes to a bent shape shown in dashed lines in FIG. 8a, which is referred to below as the scanning shape of the cantilever. The cantilever is fixed in this bent scanning shape for insertion into high aspect ratio features during a subsequent scanning process described later.

In an alternative nulling method shown in FIG. 9, after performing the sample measurement process as in FIG. 7a, the detector 80 is moved laterally relative to the lens 105 by the offset distance D2 by the detector driver 82 so that the sensing beam 103 shifts, and the reflected beam shifts to the position 111d offset from the centre of the quadrant photodiode 108 by the distance D2. Then the cantilever 2 is bent down under control of the tilt control signal 39 until the reflected beam shifts by distance D2, the reflected beam returns to the centre of the quadrant photodiode 108, and the cantilever adopts the scanning shape shown in dashed lines in FIG. 9.

In this case, the detector driver 82 receives the offset distance D2 from the memory 50 as shown in FIG. 6, and moves the detector 80 accordingly. Note that the detector driver 82 can move the detector 80 not only in the Y-direction as shown in FIG. 6 but also in the X-direction orthogonal to FIG. 6.

The plane 2c tangent to the reflective upper face of the cantilever 2, at the point directly above the probe tip 3, is now at a known angle with respect to the reference surface 90. Assuming that the probe tip 3 is manufactured correctly with no defects, then the angle of an axis 3a of the probe tip 3 relative to the plane 2c is known. So by suitable selection of the distance D2, the cantilever can be inclined at a desired cantilever angle α which means that the axis 3a of the probe tip is oriented precisely at right angles to the reference surface 90.

Figure 10:
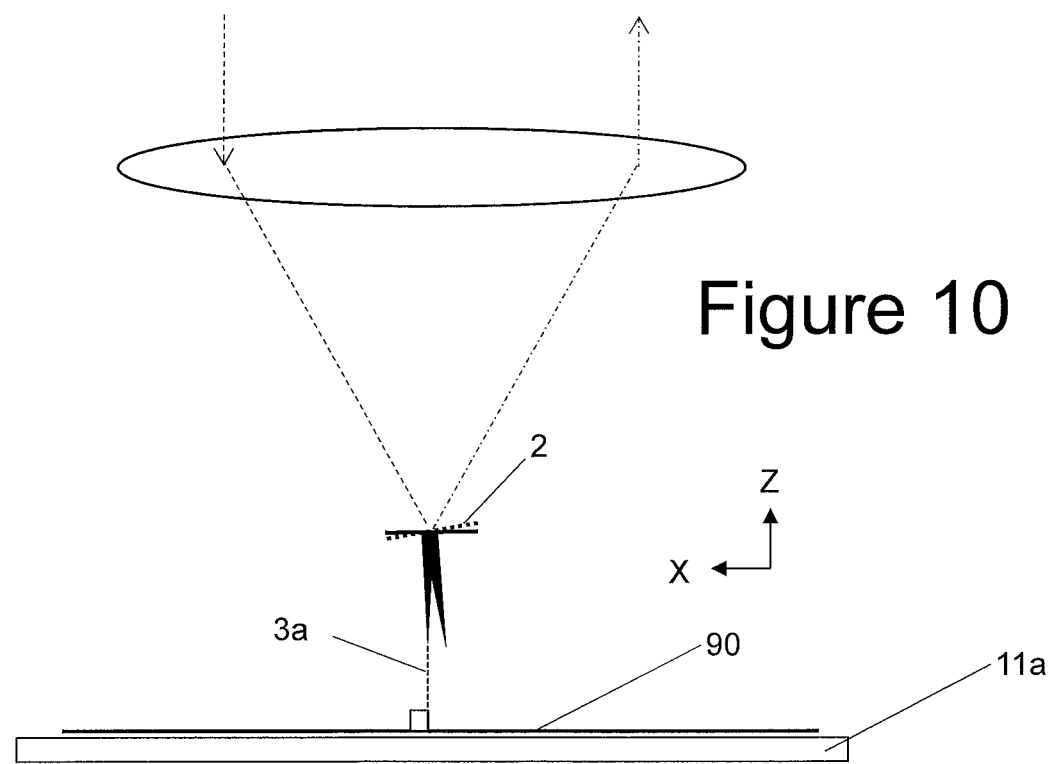
FIG. 10 shows the probe tilt angle being adjusted by twisting the cantilever.

In the example given in FIG. 8a, the plane 2c is inclined in the YZ plane by bending the cantilever 2 along its length. A similar process may also be used to incline the plane 2c in the XZ plane by twisting the cantilever as shown in FIG. 10 until the reflected beam falls on the centre of the quadrant photodiode 108. This twisting motion of the cantilever can be achieved by differentially driving the two radiation spots 15a,b of the cantilever of FIG. 4. Note that the twisting and flexing of the cantilever can be controlled separately and independently. So they may be adjusted at the same time to un-tilt the probe tip simultaneously in both axes, or sequentially (one after the other). In the case of FIG. 10 the shape of the cantilever 2 changes to a twisted (and optionally also bent) scanning shape shown in dashed lines in FIG. 10, and it is fixed in that scanning shape for a subsequent scanning process described below.

The reference surface 90 defines a reference surface axis 90a normal to the reference surface 90 as shown in FIGS. 11a and 12a. The axis 3a of the probe tip has a reference tilt angle relative to this reference axis 90a. In the process described above, an orientation of the plane 2c tangent to the reflective upper face of the cantilever 2 is measured relative to the reference surface 90 to generate a probe orientation measurement—the position of the beam reflected from the cantilever on the photodiode 108 providing this probe orientation measurement.

FIG. 11b shows a reflected beam position 111d and associated probe orientation measurement Δ corresponding with FIG. 11a, and FIG. 12b shows a reflected beam position 111e corresponding with FIG. 12a. The shape of the cantilever is changed in accordance with the probe orientation measurement Δ so that the probe tip 3 moves relative to the cantilever mount 13 and the reference tilt angle decreases from a first reference tilt angle $\theta_1$ shown in FIG. 11a, to a second reference tilt angle $\theta_2$ shown in FIG. 12a. Ideally the second reference tilt angle $\theta_2$ is zero so the axis 3a of the probe tip is parallel to the reference surface axis 90a, but in practice there may be some inaccuracy in the adjustment so the second reference tilt angle $\theta_2$ is non-zero, albeit much smaller in magnitude than the first reference tilt angle $\theta_1$. Note that the sizes of the angles $\theta_1$ and $\theta_2$ are highly exaggerated for purposes of illustration. The first reference tilt angle $\theta_1$ is typically of the order of degrees, and ideally the second reference tilt angle $\theta_2$ is less than 1 degree, less than 0.5 degree, or less than 0.1 degree.

The probe orientation measurement Δ from the photodiode 108 determines both the magnitude and direction of the change in tilt angle required to minimise the second reference tilt angle $\theta_2$. So in the example of FIG. 12b the cantilever is flexed to generate a tilt angle reduction $\Delta\theta_{yz}$ in the YZ plane and also twisted to generate a tilt angle reduction $\Delta\theta_{xz}$ in the XZ plane.

As mentioned above, the laser 30 is arranged to change the shape of the cantilever in accordance with a second drive signal at the second driver input 31, and the second drive signal is generated by a second controller 33. As described in further detail below, a waveform generator 40 is arranged to receive the surface signal from the surface detector output line 23 and modify the second drive signal on the second driver input 31 in response to receipt of the surface signal, the modification of the second drive signal causing the second driver 30 to control the probe—more specifically to drive the probe in opposition to the first drive signal so that the probe tip 3 decelerates in Z and then retracts away from the sample 7.

After the probe tip 3 has been oriented as described above, then a scanning operation is performed to generate an image of the sample 7. An XY raster-scanning motion is imparted to the sample 7 by a piezoelectric XY-actuator 11 which moves a sample stage 11a carrying the sample 7 under the control of a scan controller 26 and an actuator controller 27.

FIG. 13a shows the trajectory of the apex of the probe tip 3 as it scans a trench 17 in a sample surface 7g. The sample surface 7g is part of the upper surface of the sample 7 on the sample stage 11a shown in FIG. 1. The sample surface 7g defines the sample surface axis 7a which is normal to the sample surface 7g and the probe tip 3 has a scanning tilt angle β relative to this sample surface axis 7a. Note that the reference surface 90 used in the orientation process above is also on the sample stage 11a, so the sample surface axis 7a can be assumed to be precisely parallel with the reference surface axis 90a. As shown in FIG. 13b, the trench 17 has a trench axis 17a which is parallel with the sample surface axis 7a so can also be assumed to be parallel with the reference surface axis 90a.

Initially there is a tip approach phase 41 before generation of the surface signal in which the first driver 4 moves both the cantilever 2 and the probe tip 3 vertically down towards the surface of the sample 7. During this tip approach phase 41 the cantilever is bent down in its scanning shape so the axis of the tip 3 is approximately at right angles to the sample surface 7g and parallel with the sample surface axis 7a—in other words the scanning tilt angle β is approximately zero. The trajectory of the tip 3 is a vertical straight line 41 because the inclination of the cantilever is not changing substantially during this tip approach phase 41, and also because the first driver 4 is a linear piezoelectric actuator which extends in a substantially straight line as the probe tip is inserted into the trench 17.

As mentioned above, an XY raster-scanning motion is imparted to the sample 7 by the piezoelectric XY-actuator 11. So in this example the relative horizontal motion between the probe and the sample 7 in the XY plane is generated by motion of the sample rather than by motion of the probe. In another embodiment the relative motion in the XY plane may be generated instead by motion of the probe (the scanned sample remaining stationary). The cyclic vertical motion imparted by the first driver 4 has a frequency of the order of 10 kHz and amplitude of the order of 200 nm. The raster-scanning horizontal motion in the X direction imparted by the XY-actuator 11 has a frequency of the order of 1-100 Hz and an amplitude of the order of 1 micron. Hence the vertical (Z) motion is dominant so the raster-scanning horizontal motion is ignored in FIG. 13a. Rather than imparting a continuous raster-scanning motion, the XY-actuator 11 may instead generate a stop and step motion in which each approach/retract cycle is performed at a static location (with motion in Z but no motion imparted in X or Y by the XY-actuator 11). This may be preferable for very deep and narrow trenches where no XY motion is desirable during the measurement cycle.

For the majority of the time during the tip approach phase 41 the first drive signal changes at a substantially constant and predetermined rate, so the probe tip 3 moves towards the sample surface at a substantially constant speed.

Next the surface detection unit 22 detects an interaction of the probe tip 3 with the sample surface and outputs the surface signal. The surface signal is generated by a resonant detection method which operates as follows. The waveform generator 40 provides a periodic dither signal which is tuned to a flexural or torsional resonance frequency of the cantilever 2. This dither signal is used to modulate the laser 30, or another photothermal actuation laser (not shown). The dither signal brings about periodic photothermal stress in the cantilever, which excites a periodic motion of typically between 1-10 nanometres in amplitude at a frequency of the order of MHz. Note that the amplitude of the periodic dither motion is much lower than the non-resonant motion generated by the second drive signal on the second driver input 31. By way of example the non-resonant motion may have a travel distance which is 10-1000 times larger than the amplitude of the periodic dither motion.

In the example above the dither signal is tuned to a flexural or torsional resonant frequency of the cantilever 2, bringing about a periodic resonant motion, but in an alternative embodiment the dither signal may be at a different frequency so the dither motion is non-resonant.

The probe is advanced towards the surface until the tip 3 interacts with the surface, typically arising from repulsive forces but any force interaction that is present could in principle be employed. As a result a change in amplitude, phase or frequency of the periodic dither motion occurs which is detected by the surface detection unit 22 and causes the surface detection unit 22 to generate the surface signal. Other detection schemes for resonant detection are known in the art and can be implemented accordingly. For example, a torsional resonance could be employed, and the torsional motion of the probe monitored.

The surface height calculator 21, or any other suitable measurement system, measures the surface height based on the output 20 of the interferometer at the time of generation of the surface signal. Each measurement of surface height (one per cycle) is triggered by the surface signal and sent by the surface height calculator 21 to a data collection unit 25.

During the tip approach phase the second drive signal is high, so the actuation beam 32 is on and the cantilever has a bent down scanning shape as shown in FIG. 14. The surface signal acts as a trigger for the waveform generator 40 to modify the second drive signal on the second driver input 31 so the second drive signal goes from high to low (turning off the actuation beam 32). This modification of the second drive signal causes the cantilever 2 to cool and the probe tip 3 to retract away from the scanned sample from the surface position 60 to a retracted position 61. During this cantilever retract phase immediately after generation of the surface signal the cantilever 2 changes shape by unbending as shown in FIG. 15. This modification of the second drive signal causes the probe tip 3 to rapidly retract away from the surface of the sample following a slightly curved trajectory 42.

At the time of generation of the surface signal the waveform generator 40 modifies the first drive signal on the first driver input 5 so the rate of change of the first drive signal gradually reverses polarity—in other words the first driver 4 reverses from driving the base 2a of the cantilever down and towards the sample, to driving the base 2a of the cantilever up and away from the sample in a retract phase. The first driver 4 then retracts the probe up and away from the sample in a support retract phase during which the probe tip 3 follows a vertical linear trajectory 43.

During a first part of the support retract phase the cantilever 2 is un-bent. Next the waveform generator 40 resets the second drive signal, causing the actuation beam 32 to turn on again and the cantilever 2 to bend down again to its scanning shape so the probe tip axis 3a is again oriented vertically ready for the next cycle.

Figure 16:
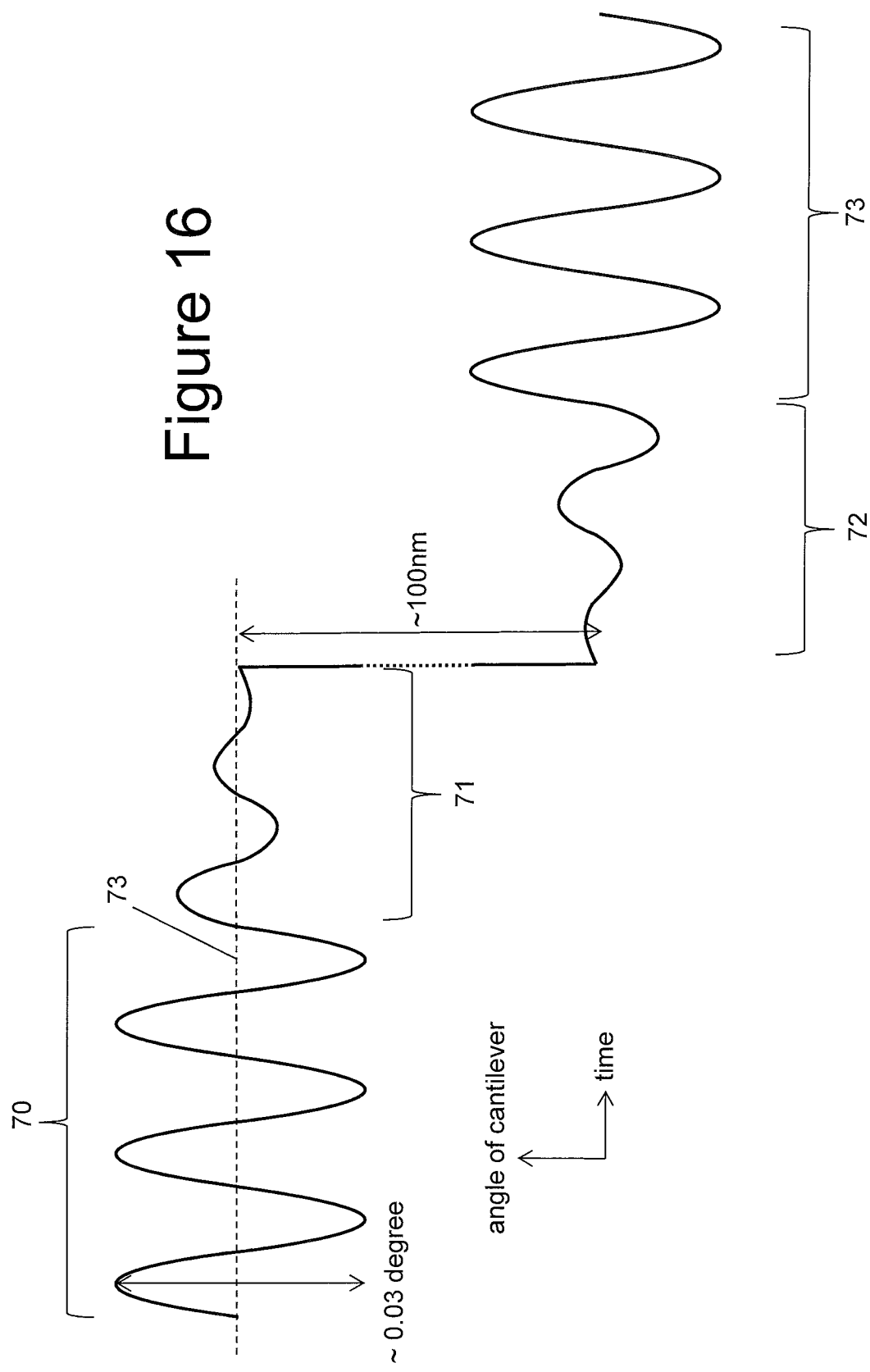
FIG. 16 shows the dither oscillation of the cantilever near a time of surface detection.

FIG. 16 is a graph showing the angle of the cantilever relative to the sensing beam 103 immediately before and after surface detection. As mentioned above, a periodic dither signal is used to modulate the actuation beam 32 from the laser 30, or another photothermal actuation laser (not shown) and this periodic dither signal causes the cantilever to oscillate with a periodic dither motion of typically between 1-10 nanometres in amplitude at a frequency of the order of MHz. This periodic dither motion can be seen in FIG. 16, which show three cycles 70 of the periodic dither motion at full amplitude in free space, then the interaction with the sample causes the amplitude to reduce over the course of two further cycles 71 until the surface is detected and the cantilever unbends rapidly with a travel distance of the order of 100 nm. The unbent cantilever then returns to the steady state amplitude of 1-10 nm over a number of cycles 72, i.e. ringing up which will depend on the Quality Factor. The unbent cantilever then continues to oscillate as shown with the full free space amplitude of 1-10 nm as indicated at 73.

The exact trajectory of the probe will depend on many factors, such as the nature of the interaction of the sample and the speed of approach. The interaction could take place over more or fewer cycles than shown in FIG. 16 at 71. There would also be a time constant related to the relaxation of the probe.

The angle of the cantilever oscillates slightly as shown at 70 as the probe tip moves towards the surface of the sample due to the small amplitude periodic dither motion of the probe tip. However the angle can be considered to be substantially constant as the probe tip moves towards the surface of the sample, since the amplitude of the dither motion shown in FIG. 16 is very small compared with the amplitude of the translation of the base of the cantilever towards and away from the surface of the sample which is typically of the order of 500-1000 nm, and is hence much larger than the 1-10 nm amplitude of the dither motion shown in FIG. 16. Similarly the trajectory 42 of the probe tip during unbending of the cantilever is of the order of 100 nm and hence also much larger than the 1-10 nm amplitude of the dither motion shown in FIG. 16.

An average angle 73 of the cantilever relative to the sensing beam and to the sample 7 remains substantially constant as the probe tip and the base of the cantilever translate together towards the sample surface, since the angle will be oscillating rapidly on either side of the average 73 as shown in FIG. 16, at a frequency of the order of MHz which is much higher than the frequency of the translation of the base of the cantilever towards and away from the surface of the sample—of the order of 10 kHz. The same is true of the second drive signal—that is, the waveform generator 40 is arranged to control the second drive signal so that an average of the second drive signal remains substantially constant as the probe tip and the base of the cantilever translate together towards the surface of the sample.

In response to receipt of the surface signal, the shape of the cantilever is changed so that the angle of the cantilever relative to the sensing beam 103 changes. In the example given above the heating of the cantilever is decreased in response to the receipt of the surface signal, by turning off the actuation beam 32. This causes the cantilever to adopt a more relaxed state (in this case—by unbending). In an alternative embodiment the heating of the cantilever may instead be increased in response to the receipt of the surface signal. In other words the actuation beam 32 may be turned on, rather than off.

The height signal from the interferometer 10 may be used both by the surface height calculator 21 to take a measurement from the surface of the scanned sample and by the surface detection unit 22 to detect the interaction of the probe tip with the surface of the scanned sample. Alternatively the height signal from the interferometer may be used by the surface height calculator 21 to take a measurement from the surface of the scanned sample, but not used by the surface detection unit 22 to detect the interaction of the probe tip with the surface of the sample. Rather, the surface detection unit 22 uses the optical-lever based angle signal 124 from the photodiode 108 to detect the interaction of the probe tip with the surface of the scanned sample. In other words, the optical-lever based angle signal 124 is used to detect the surface position rather than the interferometer based height signal 20.

In this case the system can optionally use a DC threshold detection method to generate the surface signal rather than the resonant detection method described above in relation to FIG. 16. No dither signal is applied by the waveform generator 40, and the angle signal 124 is input to the surface detection unit 22. The segmented photodiode 108 is split into a number of segments (typically four). If the angle of the cantilever 2 changes, then the position of the reflected beam on the photodiode 108 also changes. So the relative outputs of the segments of the segmented photodiode 108 gives an indication of the angle of the cantilever relative to the sensing beam 103, which is output as the angle signal 124.

As mentioned above, during the approach phase 41 the angle of the cantilever 2 is substantially constant. The probe tip 3 interacts with the surface of the scanned sample which causes the cantilever 2 to bend up. When the angle of the cantilever 2 (as measured by the angle signal 124) changes by more than a preset DC threshold, then the surface detection unit 22 generates the surface signal.

Figure 17:
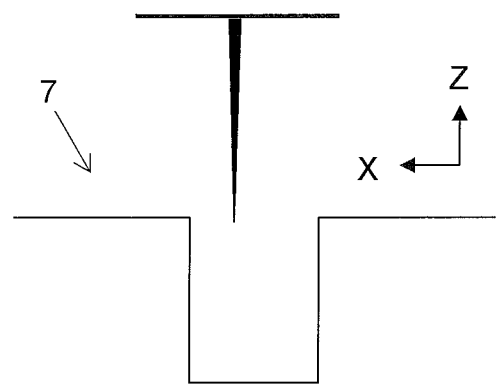
FIG. 17 is an end-on view of the cantilever being inserted into the trench with its probe tip inclined at a low, or zero, scanning tilt angle relative to the sample surface.
Figure 18:
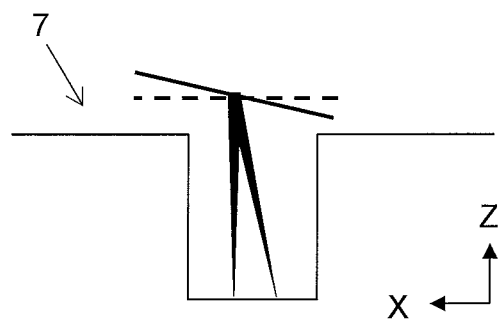
FIG. 18 shows the probe tip interacting with the base of the trench and then being rapidly retracted by twisting the cantilever.
Figure 19:
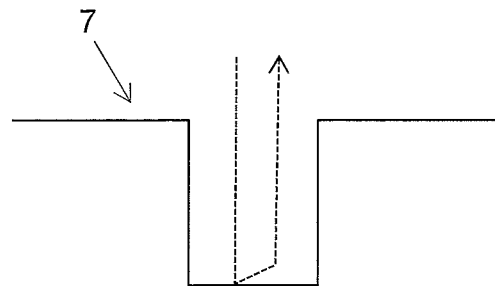
FIG. 19 shows a trajectory of the probe tip scanning the trench as shown in FIGS. 17 and 18.

The retraction trajectory 42 shown in FIG. 13 is caused by unbending of the cantilever along its length, so a single-arm cantilever as shown in FIG. 2 can be used. If a two-arm cantilever as in FIG. 4 is used, then the retraction can be generated by twisting the cantilever in the XZ plane rather than unbending it in the YZ plane. This alternative method is shown in FIGS. 17-19.

To sum up: in an initial orientation process shown in FIGS. 7a to 12b an orientation of the probe is measured relative to a reference surface 90 (which is either part of a reference specimen on the sample stage 11a, or part of the sample 7 on the sample stage 11a) to generate a probe orientation measurement $\Delta$, then a shape of the cantilever is changed (by flexing and/or twisting the cantilever) in accordance with the probe orientation measurement $\Delta$ so that the probe tip moves relative to the cantilever mount 13 and the reference tilt angle decreases from a first reference tilt angle $\theta_1$ to a second reference tilt angle $\theta_2$ which may be zero. A sample surface 7g is then scanned with the probe, the scanning including the process shown in FIG. 13a in which the cantilever mount is moved down so that the probe tip is inserted into a trench 17 or other indented feature. The orientation process shown in FIGS. 7a to 12b orients the axis 3a of the probe tip 3 so that it has a low or zero tilt angle $\theta_2$. The second drive signal generated by the second controller 33 is substantially fixed (optionally with a small dither oscillation) as the probe tip is inserted into the trench 17, so the shape of the cantilever is also substantially fixed in its scanning shape and the scanning tilt angle remains low as the probe tip is inserted into the trench 17—albeit with a small variation caused by the dither oscillation. Preferably the scanning tilt angle is approximately zero relative to the sample surface axis 7a, at least on average, as the probe tip is inserted into the trench 17.

The scanning tilt angle of the probe tip is at least lower than the first reference tilt angle $\theta_1$ as the probe tip is inserted into the trench 17 and preferably it is much lower, for instance below 50%, 30%, 10%, 5% or 1% of the first reference tilt angle $\theta_1$. By way of example the scanning tilt angle during insertion into the trench 17 may be less than 1 degree, less than 0.5 degree, or less than 0.1 degree.

The scanning tilt angle of the probe tip increases slightly as the tip follows the retraction trajectory 42, but returns to approximately zero as the probe tip 3 follows the vertical linear retraction trajectory 43.

As shown in FIG. 14 the trench 17 has an inlet 7c; a base 7d and a pair of opposed side walls which extend from the inlet to the base. The trench has a depth D from the inlet to the base, a width W at the inlet, and an aspect ratio D/W. In the example of FIG. 14 the aspect ratio D/W is about 1.5, but it may be greater than 2, 5 or 10.

Similarly the probe tip has a root and a tip, a length L from the root to the tip, a maximum diameter Wc at its root, and an aspect ratio L/Wc which is greater than 5, 10 or 15.

In the example of FIG. 3 the high aspect ratio probe tip 3 is connected directly to the cantilever, but in the alternative example of FIG. 5 (which is not to scale) the probe tip 3 is a high aspect ratio whisker extending from the apex of a conical tip base 3*a*.

In the example of FIG. 5, the probe tip 3 has a root diameter Wc=10 nm, a length L=200 nm, and an aspect ratio L/W=20. The length L of the probe tip 3 must be greater than the depth D of the trench, and the width Wc must be less than the width W of the trench at its inlet 7*c*.

The method of WO2015/197398 is not suitable for scanning high aspect ratio indented features such as trenches, holes, wells or pits, since the highly tilted probe tip will clash with the lip 7*e* of the trench 7 where the side walls of the trench meet the sample surface 7*g*. Therefore in the method described above the scanning tilt angle of the probe tip is kept low for insertion into the trench 17 and retraction from the trench 17, to avoid such a clash with the lip 7*e*. The 1-10 nm amplitude dither motion shown in FIG. 16 generates only a small change of scanning tilt angle of the probe tip 3, of the order of 0.03 degrees, which will not cause the probe tip 3 to clash with the lip 7*e*.

An optical calibration process for determining the tilt angle of the plane 2*c* of the reflective upper face of the cantilever 2, at the point directly above the probe tip 3, is described above with reference to FIGS. 7*a* to 12*b*. If the angle of the probe tip 3 relative to the plane 2*c* of the cantilever is not known accurately, then a direct measurement of the tilt angle of the probe tip 3 can be performed as follows. This direct measurement may be performed in addition to the optical measurement method of FIGS. 7*a* to 12*b*, or as a substitute.

Figure 20:
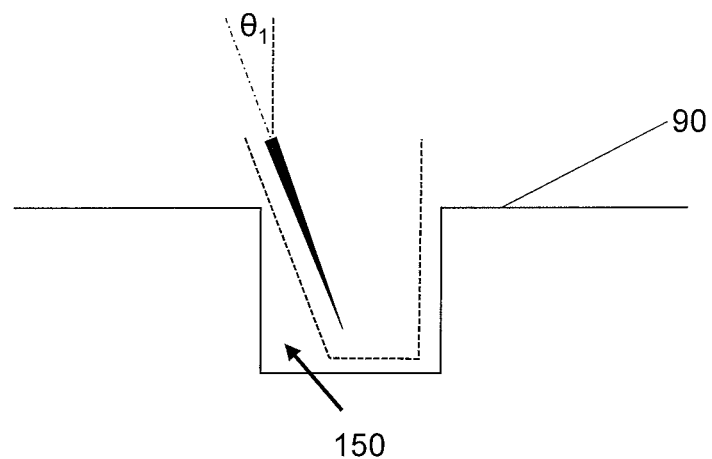
FIGS. 20 and 21 show an alternative probe orientation measurement process in which a probe tip scans a symmetrical trench or other indented feature.
Figure 21:
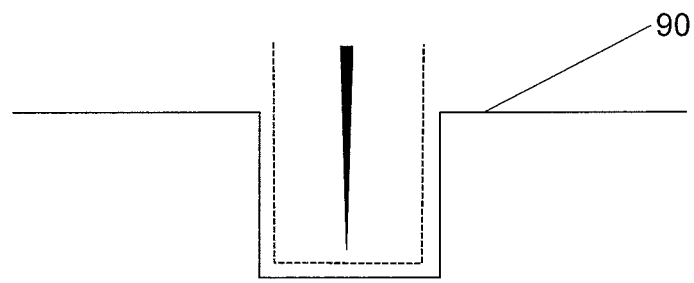

FIGS. 20 and 21 show the probe tip 3 scanning a trench or other indentation in a reference surface. The trench has a symmetrical structure, with opposed vertical side walls. In FIG. 20 the probe tip 3 is not aligned with the side walls, whereas in FIG. 21 the probe tip 3 is oriented vertically so that it is precisely aligned with the side walls.

The dashed lines in FIGS. 20 and 21 indicate the parts of the trench which can be accessed by the probe tip 3. A consequence of the misalignment in FIG. 20 is that the probe tip 3 cannot access a zone 150 on the left-hand side of the trench, although it can access the right-hand side of the trench. The result is that reduced information is gathered on the left-hand side of the trench. This asymmetry will be reflected in the reconstructed map of the reference surface.

A method of measuring and aligning the probe tip 3 is as follows. First a scan is carried out of the reference surface with the probe in its nominally "untilted" orientation at a reference tilt angle of $\theta_1$ to generate a map of the reference surface. A number of reference features, such as the trench in FIGS. 20 and 21, are symmetrical and accordingly are expected to be imaged as such. Therefore, after the first scan is complete, the map of the reference surface obtained with the probe in this orientation is analysed. The appearance of multiple features with a common level of asymmetry would indicate that the probe is misaligned. The magnitude and direction of misalignment can be calculated from the asymmetry of the imaged feature. A compensatory tilt is then applied to the cantilever beam 2 so as to reduce the reference tilt angle and align the probe tip 3 vertically as shown in FIG. 21. Alternatively the cantilever can be adjusted by a preset amount, in a direction determined by the analysis of the map from the first scan, so as to reduce the asymmetry and a further image collected. This process can be repeated until the features within the image that are expected to be symmetric appear so in the image.

Two image processing packages which can be used to generate and analyse the map of the sample are SPIP from Image Metrology A/S (see http://www.imagemet.com) and Gwyddion which is Free and Open Source software (see http://gwyddion.net).

The asymmetry of an imaged feature may be determined by line profile analysis—that is, by extracting a line of data from the image and analysing that line of data. This line of data can be along the scan direction of the probe or an arbitrary direction, and the line data could be an average of multiple lines or interpolated to reduce noise.

Alternatively the asymmetry of an imaged feature may be determined by tip shape characterisation, as described for example at:

http://gwyddion.net/documentation/user-guide-en/tip-convolution-artefacts.html; or J. S. Villarubia, J. Res. Natl. Inst. Stand. Technol. 102 (1997) 425

FIG. 21 shows the probe scanning the same surface feature when it is correctly aligned. In this case a symmetrical path is traced by the tip. The symmetry of this path is reflected in the image and the probe is then known to be correctly aligned.

The reference surface has a known arrangement of features that are expected to give rise to characteristic signals in the data. The departure of the observed signals from those that are anticipated may be used to deduce the misalignment of the probe. Optionally the reference surface has high aspect ratio features (such as trenches or peaks) with a higher aspect ratio (length/width) than the probe tip.

In the optical measurement process of FIG. 11*b* a probe orientation measurement Δ is obtained by reflecting a sensing beam off the cantilever. In the direct probe tip measurement process described above the probe orientation measurement is instead obtained by scanning a symmetrical feature as in FIG. 20 to generate a map of the reference surface which is then analysed to derive the probe orientation measurement. The probe orientation measurement is used to deduce and then correct the misalignment of the probe relative to the reference surface.

Once the probe has been oriented relative to a reference surface as described in FIG. 7-12 or 21, then it is possible to scan multiple samples without having to repeat the orientation process. The probe orientation process will be repeated periodically with a given probe, and/or when the probe is replaced.

Each of the electronic elements shown in the Figures and described in the text (for instance the tilt controller 38; surface detector 22; surface height calculator 21; waveform generator 40; actuator controllers 8, 33, 27; waveform generator 40; scan controller 26; data collection unit 25 etc) could be implemented as hardware, software, or anything else, including any combination of hardware and software, for example. By way of example: a single field-programmable gate array (FPGA) or digital signal processor (DSP), or multiple FPGAs or DSPs, could implement all of the electronic elements, or each electronic element could be implemented by a dedicated FPGA or DSP, or any combination of FPGAs or DSPs.

Although the invention has been described above with reference to one or more preferred embodiments, it will be appreciated that various changes or modifications may be made without departing from the scope of the invention as described in the appended claims.

The invention claimed is:

1. A method of scanning a feature with a probe, the probe comprising a cantilever mount, a cantilever extending from the cantilever mount to a free end, and a probe tip carried by the free end of the cantilever, the method comprising: measuring an orientation of the probe relative to a reference surface to generate a probe orientation measurement, wherein the reference surface defines a reference surface axis which is normal to the reference surface and the probe tip has a reference tilt angle relative to the reference surface axis; changing a shape of the cantilever in accordance with the probe orientation measurement so that the probe tip moves relative to the cantilever mount and the reference tilt angle decreases from a first reference tilt angle to a second reference tilt angle; and scanning a sample surface with the probe, wherein the sample surface defines a sample surface axis which is normal to the sample surface and the probe tip has a scanning tilt angle relative to the sample surface axis, and during the scanning of the sample surface the cantilever mount is moved so that the probe tip is inserted into a feature in the sample surface with the scanning tilt angle below the first reference tilt angle.

2. The method of claim 1, wherein a first driver translates the cantilever mount in accordance with a first drive signal; and a second driver changes the shape of the cantilever in accordance with a second drive signal.

3. The method of claim 2, wherein scanning the sample surface comprises controlling the first drive signal so that the first driver drives the cantilever mount repeatedly towards and away from the sample surface in a series of cycles; generating a surface signal for each cycle on detection of an interaction of the probe tip with the sample surface; and modifying the second drive signal in response to receipt of the surface signal, the modification of the second drive signal causing the second driver to change the shape of the cantilever so that the probe tip retracts away from the sample surface, wherein for each cycle there is an approach phase before generation of the surface signal in which the first driver moves the cantilever mount and the probe tip towards the sample surface, and a retract phase after generation of the surface signal in which the first driver moves the cantilever mount and the probe tip away the sample surface.

4. The method of claim 2, wherein the first driver is a linear actuator which extends in a substantially straight line as the probe tip is inserted into the feature.

5. The method of claim 1, wherein the probe tip is inserted into the feature with the scanning tilt angle below 50%, 30% or 10% of the first tilt angle.

6. The method of claim 1, wherein the probe tip is inserted into the feature with the scanning tilt angle below 1 degree, preferably below 0.5 degrees, and most preferably below 0.1 degree.

7. The method of claim 1, wherein measuring the orientation of the probe relative to the reference surface to generate the probe orientation measurement includes interacting with the reference surface.

8. The method of claim 1, wherein an orientation of the probe tip relative to the reference surface is measured to generate the probe orientation measurement.

9. The method of claim 8, wherein the orientation of the probe tip relative to the reference surface is measured by: scanning the reference surface with the probe to generate a data set; analysing the data set to identify asymmetric features in the data set; and determining a degree of asymmetry in the asymmetric features to generate the probe orientation measurement.

10. The method of claim 1, wherein an orientation of the cantilever relative to the reference surface is measured to generate the probe orientation measurement.

11. The method of claim 10, wherein the orientation of the cantilever relative to the reference surface is measured by: illuminating the reference surface with a sensing beam via a lens so that the sensing beam is reflected by the reference surface to generate a beam reflected from the reference surface; collecting the beam reflected from the reference surface with the lens and directing it onto a position sensitive detector which generates a reference measurement indicative of a position of the beam reflected from the reference surface on the position sensitive detector; illuminating the cantilever with the sensing beam so that the sensing beam is reflected by the cantilever to generate a beam reflected from the cantilever; collecting the beam reflected from the cantilever with the lens and directing it to the position sensitive detector which generates a cantilever measurement indicative of a position of the beam reflected from the cantilever on the position sensitive detector; and generating the probe orientation measurement in accordance with the reference measurement and the cantilever measurement.

12. The method of claim 1, wherein changing the shape of the cantilever comprises flexing and/or twisting the cantilever.

13. The method of claim 1, wherein the probe tip has a root and a tip, a length L from the root to the base, a maximum width W, and an aspect ratio L/W which is greater than 5, 10 or 15.

14. A method of orienting a cantilever relative to a reference surface, the method comprising: illuminating the reference surface with a sensing beam via a lens so that the sensing beam is reflected by the reference surface to generate a beam reflected from the reference surface; collecting the beam reflected from the reference surface with the lens and directing it onto a position sensitive detector which generates a reference measurement indicative of a position of the beam reflected from the reference surface on the position sensitive detector; illuminating the cantilever with the sensing beam so that the sensing beam is reflected by the cantilever to generate a beam reflected from the cantilever; collecting the beam reflected from the cantilever with the lens and directing it to the position sensitive detector which generates a cantilever measurement indicative of a position of the beam reflected from the cantilever on the position sensitive detector; changing an orientation of the cantilever relative to the reference surface; and controlling the change of orientation of the cantilever in accordance with the reference measurement and the cantilever measurement so that the cantilever becomes oriented at a predetermined angle relative to the reference surface.

15. The method of claim 14 wherein the reference surface lies in a focal plane of the lens as the reference surface reflects the sensing beam; and the method further comprises moving the lens so that the cantilever lies in the focal plane of the lens as the cantilever reflects the sensing beam.

16. The method of claim 15 wherein the cantilever is positioned in the focal plane of the lens by: combining the beam reflected from the cantilever with a reference beam in an interferometer to generate an interferogram; measuring the interferogram to generate an interferometer output; monitoring a contrast of the interferometer output; and moving the lens so that the contrast is a maximum; and wherein the reference surface is positioned in the focal plane of the lens by: combining the beam reflected from the reference surface with the reference beam in the interferometer to generate an interferogram; measuring the interferogram to generate an interferometer output; monitoring a contrast of the interferometer output; and moving the lens so that the contrast is a maximum.

17. Apparatus for scanning a sample surface with a probe, the apparatus comprising:
a probe comprising a cantilever mount, a cantilever extending from the cantilever mount to a free end, and a probe tip carried by the free end of the cantilever;
a first driver configured to translate the cantilever mount;
a tilt controller configured to generate a tilt control signal;
a second driver configured to change the shape of the cantilever in accordance with the tilt control signal; and
a measurement system configured to measure an orientation of the probe relative to a reference surface to generate a probe orientation measurement,
wherein the probe tip has a reference tilt angle relative to the reference surface; the tilt controller is configured to receive the probe orientation measurement from the measurement system and control the tilt control signal so that the second driver changes the shape of the cantilever in accordance with the probe orientation measurement, the probe tip moves relative to the cantilever mount, and the reference tilt angle decreases from a first reference tilt angle to a second reference tilt angle; the sample surface defines a sample surface axis which is normal to the sample surface; the first driver is configured to move the cantilever mount so that the probe tip is inserted into a feature in the sample surface; and the tilt controller is configured to control the tilt control signal so that the probe tip has a scanning tilt angle relative to the sample surface axis which is below the first tilt angle as the probe tip is inserted into the feature.

18. A method of scanning a feature with a probe, the probe comprising a cantilever mount, a cantilever extending from the cantilever mount to a free end, and a probe tip carried by the free end of the cantilever, the method comprising:
measuring an orientation of the probe relative to a reference surface to generate a probe orientation measurement, wherein the reference surface defines a reference surface axis which is normal to the reference surface and the probe tip has a reference tilt angle relative to the reference surface axis; changing a shape of the cantilever in accordance with the probe orientation measurement so that the probe tip moves relative to the cantilever mount and the reference tilt angle decreases from a first reference tilt angle to a second reference tilt angle; and scanning a feature with the probe, wherein the feature surface defines a feature axis and the probe tip has a scanning tilt angle relative to the feature axis, and during the scanning of the sample surface the cantilever mount is moved so that the probe tip is inserted into the feature with the scanning tilt angle below the first reference tilt angle.

19. A method of scanning a feature with a probe, the probe comprising a cantilever mount, a cantilever extending from the cantilever mount to a free end, and a probe tip carried by the free end of the cantilever, the method comprising:
measuring an orientation of the probe relative to a reference surface to generate a probe orientation measurement, wherein the reference surface defines a reference surface axis which is normal to the reference surface and the probe tip has a tilt angle relative to the reference surface axis; changing a shape of the cantilever in accordance with the probe orientation measurement so that the probe tip moves relative to the cantilever mount and the tilt angle decreases from a first tilt angle to a second tilt angle; and scanning a sample surface with the probe, wherein during the scanning of the sample surface the cantilever mount is moved so that the probe tip is inserted into a feature in the sample surface with the probe tip substantially fixed at the second tilt angle.

20. A method of scanning a feature with a probe, the probe comprising a cantilever mount, a cantilever extending from the cantilever mount to a free end, and a probe tip carried by the free end of the cantilever, the method comprising:
measuring an orientation of the probe relative to a reference surface to generate a probe orientation measurement, wherein the reference surface defines a reference surface axis which is normal to the reference surface and the probe tip has a reference tilt angle relative to the reference surface axis; changing a shape of the cantilever in accordance with the probe orientation measurement so that the probe tip moves relative to the cantilever mount, the reference tilt angle decreases from a first reference tilt angle to a second reference tilt angle, and the shape of the cantilever changes to a scanning shape; and scanning a feature with the probe, wherein during the scanning of the sample surface the cantilever mount is moved so that the probe tip is inserted into the feature with the shape of the cantilever substantially fixed in the scanning shape.

* * * * *